(12) United States Patent
Kaku

(10) Patent No.: US 11,336,484 B2
(45) Date of Patent: May 17, 2022

(54) RELAY DEVICE

(71) Applicant: DENSO CORPORATION, Kariya (JP)

(72) Inventor: Yoshifumi Kaku, Kariya (JP)

(73) Assignee: DENSO CORPORATION, Kariya (JP)

(*) Notice: Subject to any disclaimer, the term of this patent is extended or adjusted under 35 U.S.C. 154(b) by 90 days.

(21) Appl. No.: 16/774,509

(22) Filed: Jan. 28, 2020

(65) Prior Publication Data
US 2020/0280461 A1 Sep. 3, 2020

(30) Foreign Application Priority Data
Mar. 1, 2019 (JP) .............................. JP2019-037686

(51) Int. Cl.
H04L 12/437 (2006.01)
H04B 7/155 (2006.01)
H04L 41/0654 (2022.01)
H04L 43/0823 (2022.01)
H04L 12/40 (2006.01)
H04L 12/64 (2006.01)
H04L 49/552 (2022.01)

(52) U.S. Cl.
CPC ......... H04L 12/437 (2013.01); H04B 7/1555 (2013.01); H04L 12/40182 (2013.01); H04L 12/6418 (2013.01); H04L 41/0654 (2013.01); H04L 43/0847 (2013.01); H04L 49/552 (2013.01); H04L 2012/40273 (2013.01); H04L 2012/6437 (2013.01)

(58) Field of Classification Search
None
See application file for complete search history.

(56) References Cited

U.S. PATENT DOCUMENTS

| 2010/0010690 | A1* | 1/2010 | Yoshimura | H04L 45/121 701/1 |
| 2010/0091802 | A1* | 4/2010 | Matsui | H04L 12/417 370/498 |
| 2010/0211676 | A1* | 8/2010 | Takada | H04L 12/437 709/224 |
| 2010/0246408 | A1* | 9/2010 | Kerber | H04L 12/437 370/242 |
| 2012/0290692 | A1* | 11/2012 | Reich | H04L 12/437 709/220 |
| 2015/0271019 | A1* | 9/2015 | Reich | H04L 12/4637 709/221 |

(Continued)

Primary Examiner — Gregory B Sefcheck
Assistant Examiner — Suk Jin Kang
(74) Attorney, Agent, or Firm — Posz Law Group, PLC

(57) ABSTRACT

A relay device is one of relay devices each including (i) a common port connected to a terminal and (ii) two ring ports connected to other relay devices via communication lines. Upon receiving via the common port a frame whose destination is a terminal connected to a different relay device under one of the communication lines being abnormal, the relay device transmits the frame via both (i) one of the ring ports bypassing the abnormal communication line and (ii) a communication bus. In contrast, upon receiving a frame, whose destination is a terminal connected with the relay device, via one of the ring ports and a frame, whose destination is the terminal connected with the relay device, via the communication bus, the relay device determines whether the frames match. If the frames match, the relay device transfers the matched frame to the terminal via the common port.

6 Claims, 6 Drawing Sheets

(56) References Cited

U.S. PATENT DOCUMENTS

| | | | |
|---|---|---|---|
| 2015/0358351 A1* | 12/2015 | Otsuka | H04L 12/66 |
| | | | 726/23 |
| 2015/0372975 A1* | 12/2015 | Moriya | B61L 15/0018 |
| | | | 726/12 |
| 2016/0360497 A1* | 12/2016 | Maruyama | H04L 65/608 |
| 2016/0380790 A1 | 12/2016 | Kaku | |
| 2016/0380835 A1* | 12/2016 | Ishizaki | H04L 12/427 |
| | | | 370/400 |
| 2017/0041161 A1 | 2/2017 | Kaku | |
| 2017/0366430 A1* | 12/2017 | Seo | H04L 43/106 |
| 2018/0060267 A1* | 3/2018 | Sutton | G06F 13/4208 |
| 2019/0305983 A1* | 10/2019 | Kim | H04L 12/4625 |

\* cited by examiner

RELAY DEVICE

CROSS REFERENCE RELATED APPLICATION

The present application claims the benefit of priority from Japanese Patent Application No. 2019-037686 filed on Mar. 1, 2019. The entire disclosure of the above application is incorporated herein by reference.

TECHNICAL FIELD

The present disclosure relates to a relay device included in a communication system.

BACKGROUND

For example, a plurality of relay devices are connected in a ring shape in Ethernet, to form a ring topology. "Ethernet" is a registered trademark.

In a ring topology, a ring-shaped network is configured by a plurality of relay devices and a plurality of communication lines connecting the plurality of relay devices. Each relay device includes a plurality of ports, which include common ports (i.e., unspecific ports) and two ring ports (i.e., specific ports) for ring connection. The ring-shaped network is thus capable of making one round of a frame via two communication paths formed between the relay devices. That is, suppose a case where a frame is transmitted via each of the ring ports included in one of the relay devices to a terminal connected to the common port included in different one of the relay devices; then, the transmitted frame is input to each of the ring ports in the different one of the relay devices. This also signifies that there are two communication paths between a terminal connected to a common port in any relay device (one of the relay devices) and a terminal connected to a common port of another relay device (different one of the relay devices).

SUMMARY

According to an example of the present disclosure, a relay device is provided as one of a plurality of relay devices each including (i) a common port connected to a terminal and (ii) two ring ports connected to other relay devices via a plurality of communication lines to form a ring-shaped network as a first network. Upon receiving via the common port a frame whose destination is a terminal connected to a different relay device under one of the plurality of communication lines being abnormal, the relay device transmits the frame via both (i) the first network using one of the ring ports bypassing the abnormal communication line and (ii) a second network using a communication bus different from the plurality of communication lines. In contrast, suppose a case where the relay device receives via one of the ring ports a frame whose destination is a terminal connected with the relay device and further receives via the communication bus a frame whose destination is the terminal connected with the relay device. In such a case, the relay device determines whether the frames match each other. If the frames match, the relay device transfers the matched frame to the terminal via the common port.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereinafter, an embodiment of the present disclosure will be described with reference to the drawings.

1. Configuration

Figure 1:
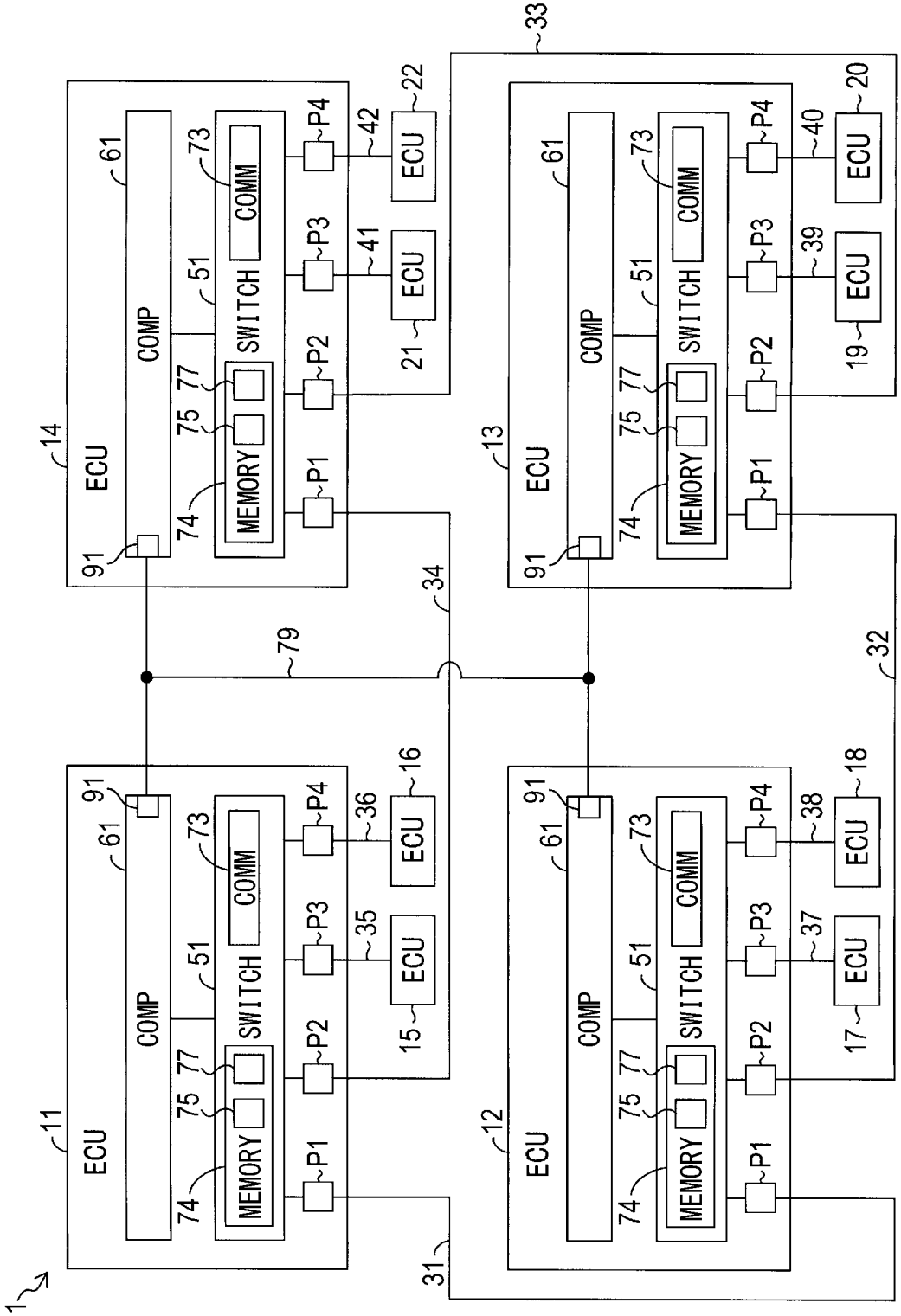
FIG. 1 is a diagram illustrating a configuration of a communication system according to an embodiment.

A communication system 1 of the embodiment shown in FIG. 1 includes ECUs 11 to 22 and communication lines 31 to 42 mounted on a vehicle. ECU is an abbreviation for "Electronic Control Unit".

Of the ECUs 11 to 22, the four ECUs 11 to 14 function as Ethernet relay devices that relay communication between the ECUs 15 to 22 as communication terminals. Therefore, hereinafter, the ECUs 11 to 14 may be also referred to as relay ECUs 11 to 14.

Each of the relay ECUs 11 to 14 includes (i) a switch 51, (ii) a plurality of ports P1 to P4, (iii) a communication control circuit 73 as an Ethernet controller or a first controller, (iv) a computation circuit as a CAN controller or a second controller, and (v) a bus interface 91 connected with a communication bus 79. Here, "controller" may be also referred to as "control circuit" or "processor". Note that the first controller and the second controller may be provided not only to be separate from each other but also to be integrated to each other; further, each or one of the first controller and the second controller may be provided as more than one controller. Thus, the first controller and the second controller may be provided as one or more controllers.

Each controller may provide a plurality of functions, while each controller may include a plurality of modules to provide the respective functions. Here, "module" may be also referred to as "section".

Further, an individual module in a controller or an individual controller may be configured by (i) a central processing unit (CPU) along with memory storing instructions executed by the CPU or (ii) hardware circuitry such as an integrated circuit or a hard-wired logic circuit with no CPU, or (iii) combination of the hardware circuitry and the CPU along with memory.

As an example of the present embodiment, as shown in FIG. 1, in each of the relay ECUs 11 to 14, the switch 51 serving as a relay processing unit is connected with the ports P1 to P4 for performing relay communication according to Ethernet standard. Note that, as another example, the ports P1 to P4 may be provided as being included in the switch 51.

Further, as an example of the present embodiment, the computation circuit as the second controller and the bus interface 91 are provided as being included in a microcomputer 61. Although not illustrated, the microcomputer 61 further includes a CPU, a ROM, and a RAM. In the relay ECUs 11 to 14, the microcomputer 61 and the switch 51 are connected via a communication link.

The number of relay ECUs 11 to 14 is four in this example, but may be other than four. The number of ports is not limited to four and may be other than four.

As an example of the present embodiment, the switch 51 is configured to include the communication control circuit 73 as the first controller that performs each process including a relay process according to the Ethernet standard. As an example, the communication control circuit 73 (i.e., first controller) may be configured by (i) an integrated circuit, or (ii) a microcomputer, or (iii) combination of the integrated circuit and the microcomputer. The operations of the switch 51 are realized by the communication control circuit 73.

In the communication system 1, the port P1 of the relay ECU 11 and the port P1 of the relay ECU 12 are connected by a communication line 31, and the port P2 of the relay ECU 12 and the port P1 of the relay ECU 13 are connected by a communication line 32. Furthermore, the port P2 of the relay ECU 13 and the port P2 of the relay ECU 14 are connected by a communication line 33, and the port P1 of the relay ECU 14 and the port P2 of the relay ECU 11 are connected by a communication line 34.

That is, the relay ECUs 11 to 14 are connected in a ring shape by connecting the ports P1 and P2 of each relay ECU to the ports P1 and P2 of the other relay ECUs via the communication lines 31 to 34. For this reason, the relay ECUs 11 to 14 and the communication lines 31 to 34 form a ring-shaped network that can make one round of the frame. The ring shape is also a loop shape.

The ECUs 15 and 16 are connected to the ports P3 and P4 of the relay ECU 11 via communication lines 35 and 36, respectively. The ECUs 17 and 18 are connected to the ports P3 and P4 of the relay ECU 12 via communication lines 37 and 38, respectively. The ECUs 19 and 20 are connected to the ports P3 and P4 of the relay ECU 13 via communication lines 39 and 40, respectively. The ECUs 21 and 22 are connected to the ports P3 and P4 of the relay ECU 14 via communication lines 41 and 42, respectively. That is, among the ports P1 to P4 of the relay ECUs 11 to 14, the ECUs 15 to 22 as communication terminals are connected to the ports P3 and P4 that are not used for ring connection.

The communication paths between the relay ECUs 11 to 14 connected in a ring shape by the communication lines 31 to 34 include two communication paths. For instance, if the relay ECU 11 is a starting point, the communication paths include (i) a counterclockwise communication path which has the direction to the relay ECU 12; and (ii) a clockwise communication path which has the direction to the relay ECU 14. These two communication paths can function as two communication paths or two routes for communication between (i) one of the ECUs 15 to 22 connected to one of the relay ECUs 11 to 14 and (ii) different one of the ECUs 15 to 22 connected to different one of the relay ECUs 11 to 14.

Hereinafter, the communication lines 31 to 34 may be also referred to as ring communication lines. Of the ports P1 to P4, the ports P1 and P2 used for ring connection are also referred to as ring ports or specific ports. Ports that are not ring ports, that is, ports P3 and P4 that are not used for ring connection are also referred to as common ports (i.e., unspecific ports).

Figure 2:
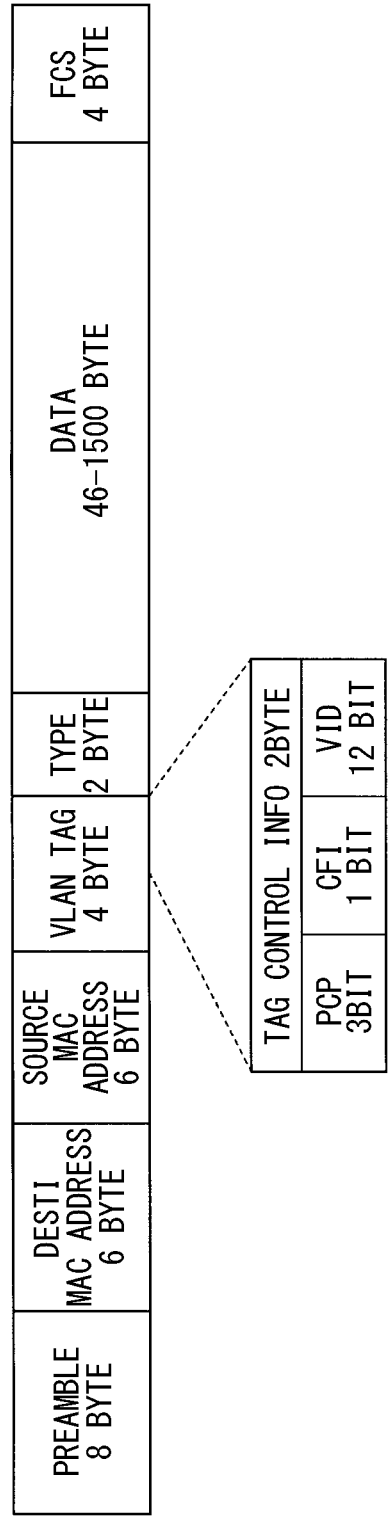
FIG. 2 is an explanatory diagram showing a configuration of an Ethernet frame.

The frame communicated between the ports P1 to P4 of the relay ECUs 11 to 14 is an Ethernet frame with a VLAN (that is, Virtual Local Area Network) tag as shown in FIG. 2, for example. The Ethernet frame includes areas of a preamble, a destination MAC address, a transmission source MAC address, a VLAN tag, a type, data, and FCS (that is, Frame Check Sequence). The destination MAC address is a MAC address of the frame destination device, and the transmission source MAC address is the MAC address of the frame source device.

Also, TCI (that is, Tag Control Information) is arranged in the latter two bytes of the VLAN tag area. The TCI includes a 3-bit PCP (that is, Priority Code Point), a 1-bit CFI (that is, Canonical Format Indicator), and a 12-bit VID (that is, VLAN Identifier).

PCP is 3-bit information that specifies the priority of a frame defined in the "IEEE802.1p" standard, and is set to any value from 0 to 7. In the present embodiment, for example, PCP is used as information on indicating a high importance level for determining a high importance level of a frame.

In other words, the QoS rank value of the VLAN tag may be used as information on indicating a high importance level. QoS is an abbreviation for "Quality of Service".

The switch 51 of each of the relay ECUs 11 to 14 includes a memory 74. The memory 74 may be, for example, a volatile memory or a rewritable nonvolatile memory. The memory 74 stores at least a MAC address table 75 and an ID table 77.

In the MAC address table 75 in each relay ECU 11 to 14, for each port in the relay ECU, a MAC address of the device connected to the port is registered. For example, in the MAC address table 75 in the relay ECU 11, the MAC address of the ECU 15 is registered for the common port P3. The MAC address of the ECU 16 is registered for the common port P4. For each of the ring ports P1 and P2, the MAC addresses of the ECUs 17 to 22 connected to the common ports P3 and P4 of the other relay ECUs 12 to 14 are registered. This is because the ECUs 17 to 22 are connected individually up to the ring ports P1 and P2 of the relay ECU 11 via other relay ECUs 12 to 14. Registration of the MAC address in the MAC address table 75 is performed by a MAC address learning function provided in the switch 51, for example. That is, when the switch 51 receives a frame via any of the ports P1 to P4, the switch 51 registers the port number of the port that received the frame and the transmission source MAC address included in the received frame, to be associated with each other in the MAC address table 71.

Then, the switch 51 of each of the relay ECUs 11 to 14 performs the following process as a relay process in Ethernet, for example. In response to receiving a frame (hereinafter referred to as "received frame") via any of the ports P1 to P4, the switch 51 determines the transfer destination port of the received frame based on the destination MAC address in the received frame and the MAC address table 75. Specifically, the MAC address table 75 is searched for the same MAC address as the destination MAC address. If there is a corresponding MAC address, the port where the searched MAC address is registered in the MAC address table 75 is determined as the transfer destination port. Then, the switch 51 transmits the received frame via the port determined as the transfer destination port.

Suppose a case where in the communication system 1, a frame is transmitted from one of the relay ECUs 11 to 14 via the ring ports P1 and P2; the frame has the destination corresponding to a communication terminal connected to the other relay ECU via the common ports P3 and P4 of the other relay ECU. In such a case, the frame is then input to the other relay ECU via each of the ring ports P1 and P2 in the other relay ECU.

For example, it is assumed that the ECU 15 connected to the relay ECU 11 transmits a frame (hereinafter referred to as a frame f15-19) destined for the ECU 19 connected to the relay ECU 13. The frame f15-19 includes the MAC address of the ECU 15 as the transmission source MAC address, and includes the MAC address of the ECU 19 as the destination MAC address.

In this case, the switch 51 of the relay ECU 11 receives the frame f15-19 via the port P3. When the switch 51 of the relay ECU 11 transmits the received frame f15-19 via the ring port P1, the frame f15-19 is passed through the relay ECU 12 and is input to the ring port P1 of the relay ECU 13. This is because the switch 51 of the relay ECU 12 receives the frame f15-19, which is transmitted from the switch 51 of the relay ECU 11, via the ring port P1, and transmits it via the ring port P2 by the relay process.

When the switch 51 of the relay ECU 11 transmits the received frame f15-19 via the ring port P2, the frame f15-19 is passed through the relay ECU 14 and is input to the ring port P2 of the relay ECU 13. This is because the switch 51 of the relay ECU 14 receives the frame f15-19, which is transmitted from the switch 51 of the relay ECU 11, via the ring port P1, and transmits it via the ring port P2 by the relay process.

Although not specifically shown, the switch 51 includes a non-volatile memory, and the non-volatile memory stores an ID (that is, identification) of the relay ECU 11 to 14 including the switch 51. That is, the ID corresponds to identification information for identifying an individual one of the relay ECUs 11 to 14. Since the switch 51 is distinguished for each relay ECU 11 to 14, the ID may be an ID of the switch 51 for each relay ECU 11 to 14.

As described above, in each relay ECU 11 to 14, the memory 74 of the switch 51 stores or records the ID table 77. In the ID table 77, the IDs of the other relay ECUs connected in a ring shape are recorded to be associated with the connection order of the other relay ECUs as viewed from at least one of the ports P1 and P2 of the relay ECU. That is, the ID table 77 of a first relay ECU of any one of the relay ECUs 11 to 14 records the information or contents indicating the relation between the IDs of the other relay ECUs and the connection order of the other relay ECUs when viewed from each port P1, P2 of the first relay ECU.

Further, the relay ECUs 11 to 14 are connected to each other via the communication bus 79 having a protocol different from that of Ethernet. The microcomputers 61 of the relay ECUs 11 to 14 can communicate with each other via the communication bus 79 by using the bus interface so as to connect with the communication bus 79. In this embodiment, the communication protocol via the communication bus 79 is, for example, CAN, but may be other than CAN. Note that CAN is an abbreviation for "Controller Area Network". CAN is a registered trademark.

2. Function for Detecting Abnormality in Ring Communication Line

The communication control circuit 73 in the switch 51 of each of the relay ECUs 11 to 14 also functions as an abnormality detection module that detects an abnormal ring communication line 31 to 34 or a communication line abnormality state. In other words, the switch 51 includes the abnormality detection module.

Here, the operation content of the abnormality detection module (i.e., the communication control circuit 73) will be described as being executed by the switch 51. When the switches 51 of the relay ECUs 11 to 14 are particularly distinguished, the switch 51 of the relay ECU 11 is described as a switch 51_11; the switch 51 of the relay ECU 12 is described as a switch 51_12; the switch 51 of the relay ECU 13 is described as a switch 51_13; the switch of the relay ECU 14 is described as a switch 51_14.

In order to detect the abnormal ring communication lines 31 to 34, one of the switches 51 of the relay ECUs 11 to 14 functions as a master switch, and the other switches function as slave switches. Here, it is assumed that the switch 51_11 is a master switch. In addition, an abnormality detection frame and an abnormality notification frame, which will be described later, are frames transferred between the ring ports P1 and P2 of the relay ECUs 11 to 14, in other words, frames that flow through a ring-shaped network.

The switch 51_11 as a master switch performs the following processes <1>, <2>, and <5>. Further, the switches 51_12 to 51_14 as slave switches perform the following processes <3>, <4>, and <5>. In other words, the abnormality detection module (i.e., the communication control circuit 73) of the switch 51_11 performs the following processes <1>, <2>, <5>, and the abnormality detection module (i.e., the communication control circuit 73) of the switches 51_12 to 51_14 performs the following processes <3>, <4>, <5>. The processes <1> to <5> below are described in Patent literature 2 (i.e., US 2017/0041161 A1). Here, US 2017/0041161 A1 is incorporated herein by reference.

<1> The switch 51_11 transmits an abnormality detection frame via one of the ring ports P1 and P2 every predetermined time Ti. Here, it is assumed that an abnormality detection frame is transmitted via the port P1. The abnormality detection frame is, for example, a frame whose destination MAC address is a code indicating that it is an abnormality detection frame.

It should be noted that the abnormality detection frame transmitted via the port P1 from the relay ECU 11 causes the switch 51_12 to 51_14 to perform the process <3> to be described later so that the abnormality detection frame goes around the ring-shape network once and returns to the port P2 of the relay ECU 11. In addition, a fixed time Ti, which is the transmission interval of the abnormality detection frame, is greater than the time required for the abnormality detection frame to go around the ring-shape network once.

<2> The switch 51_11 determines whether either the abnormality detection frame or the abnormality notification frame transmitted from another switch is received via the port P2 within a predetermined time T1 since the time of transmission of the abnormality detection frame. If neither the abnormality detection frame nor the abnormality notification frame is received within the predetermined time T1, the master notification process is performed (see <<Master notification process>> described to be later).

Note that the predetermined time T1 is greater than the time required for the abnormality detection frame to go around the ring-shaped communication path and return to the switch 51_11. In the switch 51_11, the predetermined time T1 (i.e., the period of time) since the time of transmission of the abnormality detection frame is defined as follows. That is, within the predetermined time, the switch 51_11 should receive an abnormality detection frame or an abnormality notification frame transmitted from a switch (hereinafter referred to as a previous switch) immediately before the switch 51_11 (i.e., located to be immediately upstream of the switch 51_11) in the circulation direction of the abnormality detection frame.

<<Master Notification Process>>

The master notification process referred to in the above is described as follows. That is, the switch 51_11 identifies the relay ECU (that is, the relay ECU 14) that is connected first when viewed from the port P2, from the ID table 77 of the switch 51_11. The identification of the relay ECU is realized by specifying the ID of the relay ECU or the ID of the switch. Then, the switch 51_11 detects that an abnormality has occurred in the ring communication line 34 between the identified relay ECU 14 and the relay ECU 11. Further, in order to notify the other switches 51 of this abnormality location, the switch 51_11 transmits an abnormality notification frame including the ID of the relay ECU 11 via the port P1. The abnormality notification frame is, for example, a frame whose destination MAC address is a code indicating that it is an abnormality notification frame.

<3> When the switches 51_12 to 51_14 receive the abnormality detection frame via one of the ring ports P1 and P2, the switches 51_12 to 51_14 transmit the received abnormality detection frame via one of the ports P1 and P2 that is different from the one via which the abnormality detection frame is received (hereinafter, upstream ring port).

<4> The switches 51_12 to 51_14 determine whether either the abnormality detection frame or the abnormality notification frame transmitted by another switch is received via the upstream ring port of the ring ports P1 and P2 within a predetermined time T2 since the time of reception of the abnormality detection frame. If it is determined that neither the abnormality detection frame nor the abnormality notification frame is received within the predetermined time T2, the slave notification process which will be described later, is performed.

The predetermined time T2 is greater than the predetermined time Ti that is the transmission interval of the abnormality detection frame. In the switches 51_12 to 51_14, the predetermined time T2 since the time of the reception of the abnormality detection frame is defined as follows. That is, within the predetermined time T2, the switches 51_12 to 51_14 should receive the abnormality detection frame or abnormality notification frame transmitted from the previous switch.

<<Slave Notification Processing>>

The slave notification process referred to in the above is described as follows. Now, for explanation, one of the switches 51_12 to 51_14 is referred to as a slave switch and one of the relay ECU 12 to 14 including the slave switch is referred to as a slave relay ECU. The slave switch specifies the relay ECU that is connected first when viewed from the upstream ring port of the slave relay ECU, that is, the relay ECU (hereinafter referred to as the previous relay ECU) provided with the previous switch from the ID table 77 of the slave switch. Then, the slave switch detects that an abnormality has occurred in the ring communication line between the identified previous relay ECU and the slave relay ECU among the ring communication lines 31 to 34. Furthermore, in order to notify other switches of this abnormal location, an abnormality notification frame including the ID of the slave relay ECU is transmitted via one of the ports P1 and P2 that is different from the upstream ring port.

<5> Now, for explanation, one of the switches 51_11 to 51_14 is referred to as a subject switch and one of the relay ECU 11 to 14 including the subject switch is referred to as a subject relay ECU. When an abnormality notification frame transmitted by another switch is received via one of the ports P1 and P2, the subject switch transmits the received abnormality notification frame via the other one of the ports P1 and P2 that is different from the one that received the abnormality notification frame. Further, the subject switch identifies a previous relay ECU from the ID table 77 of the subject switch. Here, the previous relay ECU is a relay ECU connected immediately before the relay ECU whose ID is included in the abnormality notification frame when viewed from the one of the ports P1 and P2 via which the abnormality notification frame is received. Then, the subject switch detects that an abnormality has occurred in the ring communication line of the ring communication lines 31 to 34 between the identified previous relay ECU and the relay ECU whose ID is included in the abnormality notification frame.

3. Transfer Control Process Performed by Switch

Next, among the processes performed by the switches 51 of the relay ECUs 11 to 14, a first transfer control process will be described with reference to FIG. 3, and a second transfer control process will be described with reference to FIG. 4.

In the following description, ECUs connected with the common ports P3 and P4 are referred to as follows. That is, ECUs connected with the common ports P3 and P4 of each relay ECUs 11 to 14 are referred to as own relay ECU connection terminals or inner connection terminals. In contrast, ECUs connected with the common ports P3 and P4 of the other relay ECUs (i.e., different relay ECUs) as viewed from each relay ECU 11 to 14 are referred to as different relay ECU connection terminals or outer connection terminals. For example, the inner connection terminals (i.e., the own relay ECU connection terminals) as viewed from the relay ECU 11 (i.e., the switch 51_11) are the ECUs 15 and 16. For example, the outer connection terminals (i.e., the different relay ECU connection terminals) as viewed from the relay ECU 11 (i.e., the switch 51_11) are the ECUs 17 to 22.

Figure 3:
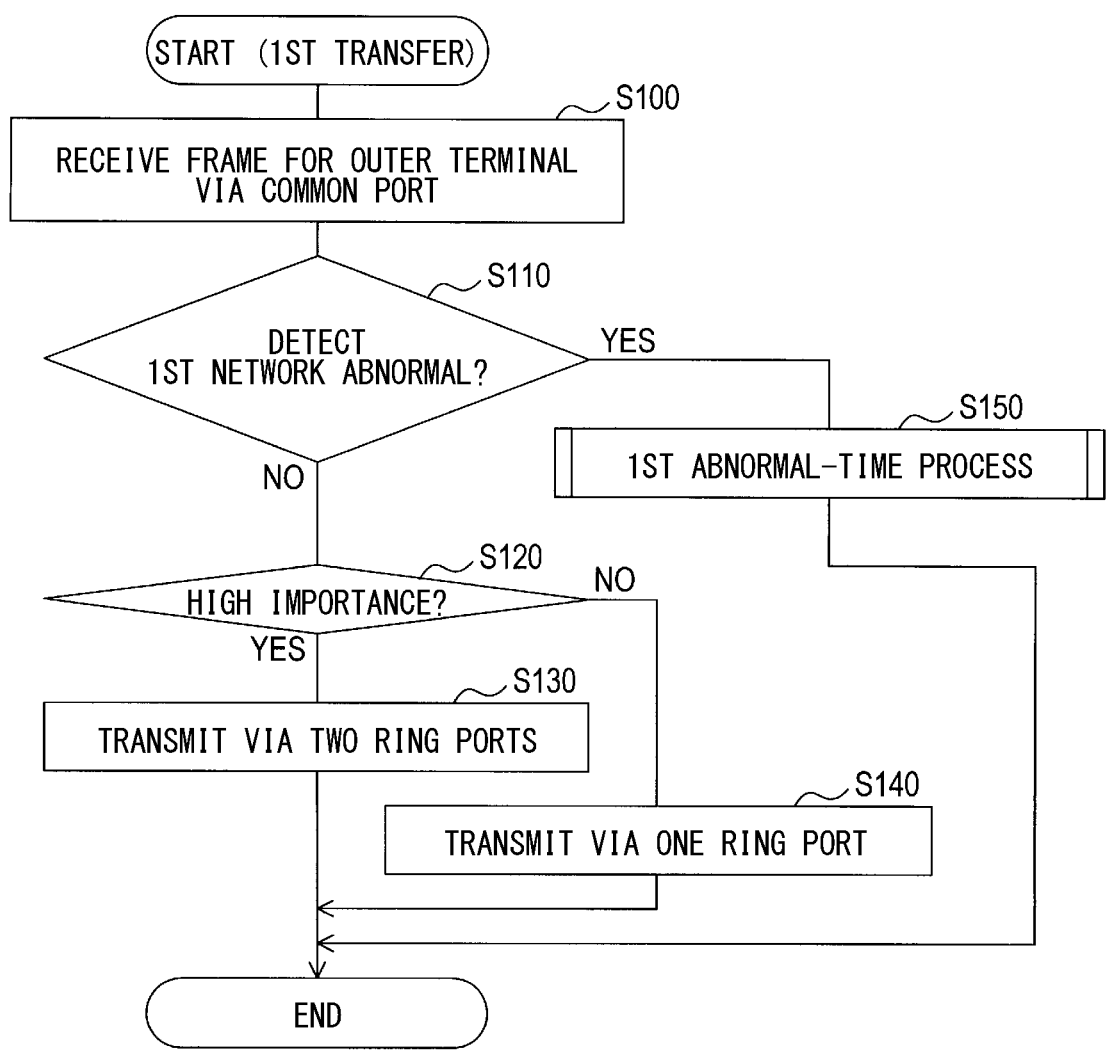
FIG. 3 is a flowchart showing a first transfer control process.
Figure 4:
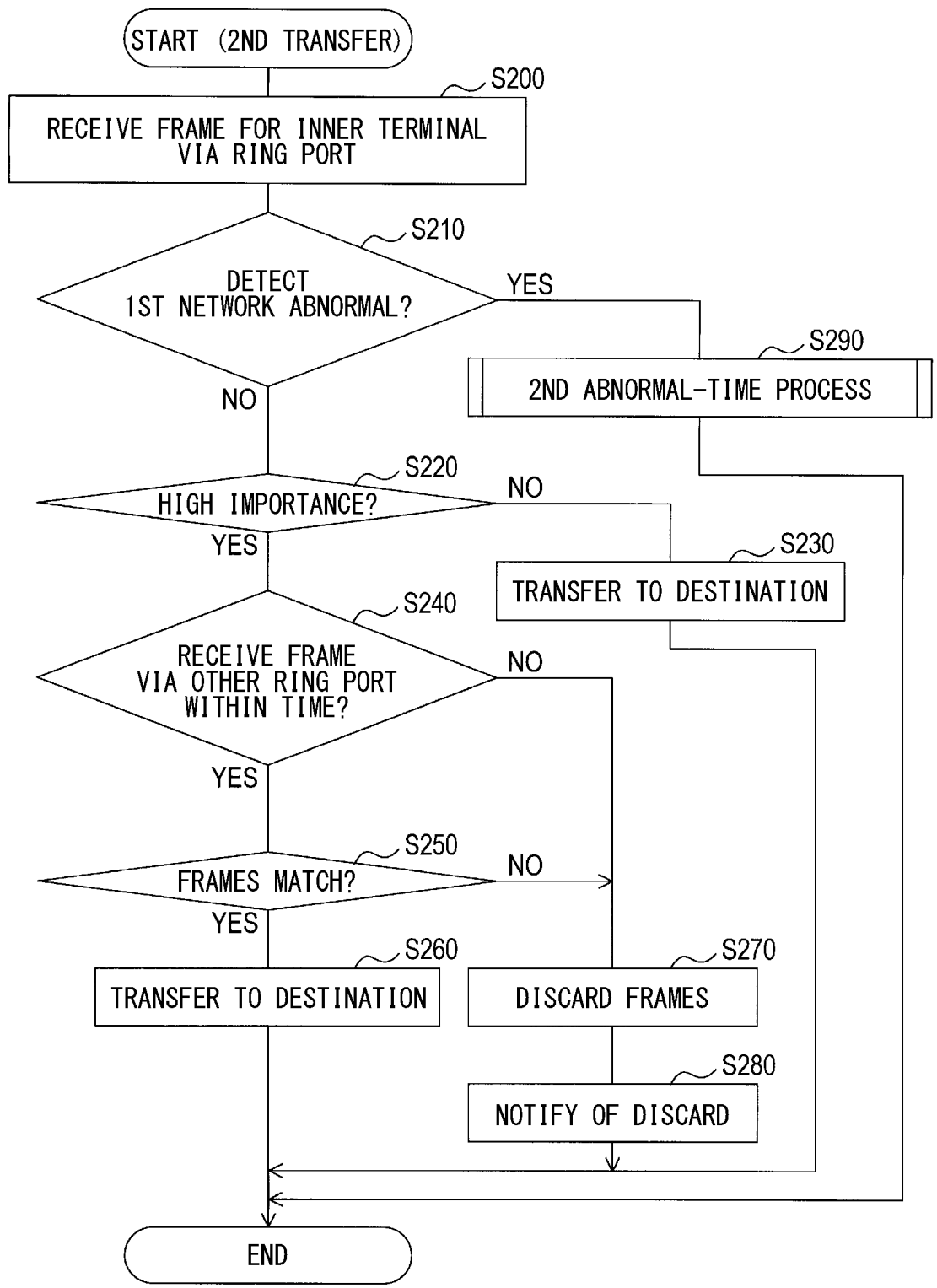
FIG. 4 is a flowchart showing a second transfer control process.
Figure 5:
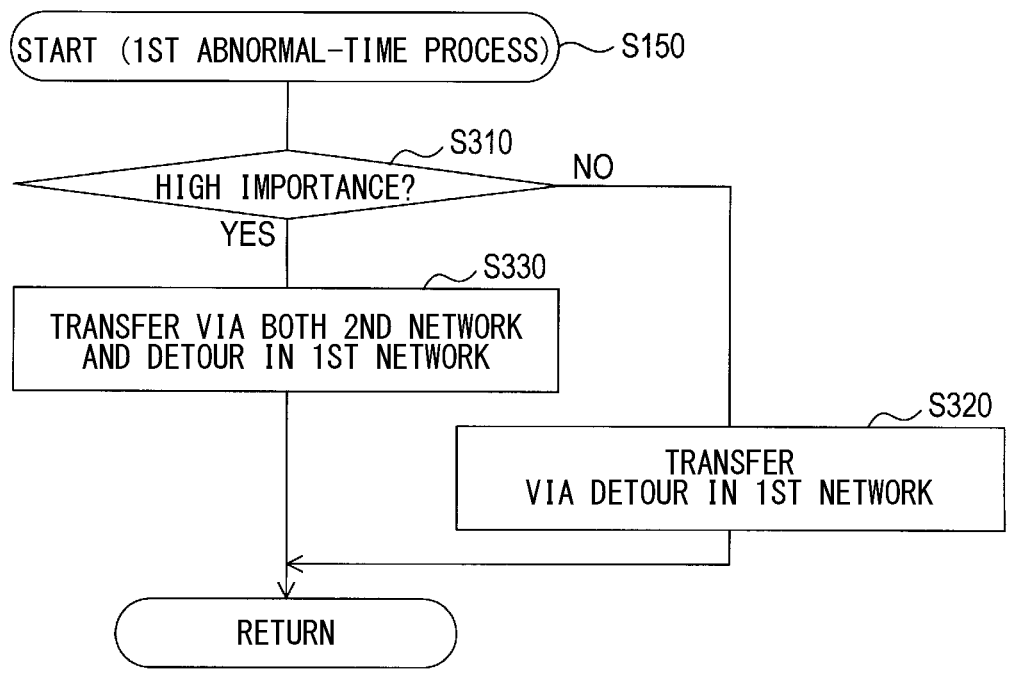
FIG. 5 is a flowchart showing a first abnormal-time process.

The following will describe processes in the flowcharts in FIGS. 3 to 5 executed by the first controller serving as the communication control circuit 73 and the second controller serving as the computation circuit or each microcomputer 61. Each flowchart includes steps (e.g., S110), one or several steps may be executed by a corresponding module (i.e., section) included in the first controller or the second controller.

<First Transfer Control Process>

As shown in FIG. 3, when the switch 51 of one of the relay ECUs 11 to 14 receives a frame destined for a different relay ECU connection terminal (i.e., a frame destined for an outer connection terminal) via one of the common ports P3 and P4 in S100, the switch 51 proceeds to S110. That is, if the destination MAC address in the frame received from one of the common ports P3 and P4 is registered for the ring ports P1 and P2 in the MAC address table 75 of the switch 51, the switch 51 proceeds to S110.

In S110, the switch 51 determines whether or not an abnormality of a first network is detected. The first network is a ring-shaped network. In S110, specifically, it is determined whether any abnormality of the ring communication lines 31 to 34 is detected by the function of the abnormality detection module (i.e., the communication control circuit 73) of the switch 51.

If determining in S110 that an abnormality in the first network has not been detected, the switch 51 proceeds to S120. In S120, the switch 51 determines whether or not the received frame indicates a high importance level. For example, the switch 51 determines whether or not the PCP value in the received frame is a predetermined importance indication value. If the PCP value is the importance indication value, the switch 51 determines that the received frame indicates a high importance level. There may be one or more importance indication values. For example, the switch 51 may determine that the received frame indicates a high importance level when the PCP value is equal to or greater than a predetermined threshold value or equal to or less than the threshold value. The PCP value may be set in the ECU that is the frame transmission source. Note that a frame indicating a high importance level may be, for example, a frame including data, which indicates or have a high importance level as data in the data area. In this case, it can be said that in S120, it is determined whether the data included in the received frame indicates a high importance level.

If determining in S120 that the received frame indicates a high importance level, the switch 51 proceeds to S130. In S130, the switch 51 transmits the received frame via each of the ring ports P1 and P2. If determining that the received frame does not indicate a high importance level in S120, the switch 51 proceeds to S140. In S140, the switch 51 transmits the received frame via one of the ring ports P1 and P2. For example, such one of the ring ports P1 and P2 that transmits a frame in S140 may be a predetermined one of the ring ports P1 and P2. Alternatively, the one of the ring ports P1 and P2 that transmits a frame in S140 may be selected so as to provide the shortest route up to the destination ECU, i.e., the route has the smallest number of relay ECUs that relay the frame to the destination ECU.

If determining in S110 that an abnormality of the first network has been detected, the switch 51 proceeds to S150. In S150, the switch 51 performs a first abnormal-time process described later.

<Second Transfer Control Process>

In contrast, as shown in FIG. 4, when the switch 51 of the relay ECUs 11 to 14 receives a frame destined for the inner connection terminal (i.e., the own relay ECU connection terminal) via one of the ring ports P1 and P2 in S200, the switch 51 proceeds to S210. Here, just for explanation, the frame, which is received via one of the ring ports P1 and P2 and destined for the inner connection terminal, may be also referred to as a subject frame. That is, if the destination MAC address in the frame received via the one of the ring ports P1 and P2 is registered for the common ports P3 and P4 in the MAC address table 75 of the switch 51, the switch 51 proceeds to S210.

In S210, the switch 51 determines whether an abnormality in the first network has been detected, as in S110 of FIG. 3. If the switch 51 determines in S210 that an abnormality in the first network has not been detected, the switch 51 proceeds to S220. In S220, the switch 51 determines whether the received frame indicates a high importance level according to the same rule as S120 in FIG. 3.

If determining that the received frame does not indicate a high importance level in S220, the switch 51 proceeds to S230. In S230, the switch 51 transfers the received frame to the destination. That is, in S230, the received frame is transmitted via the common port to which the destination ECU of the received frame is connected among the ports P1 to P4.

If determining that the received frame indicates a high importance level in S220, the switch 51 proceeds to S240. Here, the received frame which is received via the one of the ring ports P1 and P2 and is determined to indicate a high importance level is referred to as a determination target frame. In S240, the switch 51 determines whether an identical destination frame is received via the other one (i.e., different one) of the ring ports P1 and P2 within a predetermined time since the determination target frame was received via the one of the ring ports P1 and P2. Further, the above identical destination frame is a frame having the same destination as that of the determination target frame.

If the determination in S240 is affirmative, that is, "YES", the switch 51 proceeds to S250. In S250, the switch 51 determines whether or not the two frames received respectively via the ring ports P1 and P2 match each other (i.e., the switch 51 executes a match determination as to whether the two frames received respectively via the ring ports P1 and P2 match each other).

If the determination in S250 is affirmative, the switch 51 proceeds to S260, and transfers the received frame to the destination as in S230. The received frame to be transferred in S260 may be either the frame received via the ring port P1 or the frame received via the ring port P2. This is because both the frames are determined to be identical to each other by the determination (i.e., the match determination) in S250.

If the determination in S250 is negative, that is, "NO", the switch 51 proceeds to S270 and discards the frames received respectively via the ring ports P1 and P2 without transferring it to the destination.

In S280, the switch 51 notifies the microcomputer of the relay ECU including the switch 51 (i.e., host relay ECU), for example, that the frame has been discarded. The microcomputer that has received the notification notifies the other relay ECUs (i.e., different relay ECUs) through the communication bus 79 of the discard of the frame (i.e., that the frame has been discarded). In this case, the different relay ECU that has received the notification may notify the ECU serving as the transmission source of the discarded frame of the discard of the frame. The transmission source ECU that is notified of the discard of the frame can implement some fail-safe. In S280, the switch 51 may perform a process of notifying the ECU as the transmission source of the discarded frame of the discard of the frame by using the ring-shaped network.

On the other hand, even when the determination in S240 is negative, the switch 51 proceeds to S270, and discards the frame (i.e., the determination target frame) already received via one of the ring ports P1 and P2. This is because frames cannot be received via both the ring ports P1 and P2 even after a fixed time, and the determination in S250 cannot be performed. Also in this case, in S280, the switch 51 performs processing for notifying of the discard of the frame.

If the switch 51 determines in S210 that an abnormality in the first network has been detected, the switch 51 proceeds to S290 and performs a second abnormal-time process described later.

<<First Abnormal-Time Process>>

In S110 of FIG. 3, when the switch 51 determines that an abnormality in the first network has been detected, the switch 51 proceeds to S150, where the first abnormal-time process is started. Then, with reference to FIG. 5 illustrating the first abnormal-time process, in S310, the switch 51 determines whether or not the received frame (i.e., the frame destined for the different relay ECU connection terminal or frame destined for the outer connection terminal) indicates a high importance level. This S310 is the same process as S120 of FIG. 3.

If the switch 51 determines in S310 that the received frame does not indicate a high importance level, the switch 51 proceeds to S320, and transfers the received frame through a detour path of the first network. Such a detour path does not pass through an abnormal ring communication line among two communication paths up to the different relay ECU to which the destination ECU is connected in the first network (that is, a ring-shaped network). The detour path is the communication path that can transmit the frame up to the different relay ECU.

Specifically, the switch 51 has the specifying information on connection relationship between (i) the common ports P3 and P4 of the relay ECUs 11 to 14 and (ii) the ECUs 15 to 22 connected to the common ports P3 and P4 of the relay ECUs 11 to 14. Then, in S320, the switch 51 specifies the different relay ECU (hereinafter referred to as the destination relay ECU) to which the destination ECU of the received frame is connected via the ports P3 and P4 from the specifying information on connection relationship. Furthermore, the switch 51 finds a detour path which allows the frame to reach the destination relay ECU without passing through the detected abnormal ring communication line, and selects one of the ring ports P1 and P2 that is connected to the detour path. The received frame is transmitted via the selected ring port.

In S320, the received frame may be transmitted via both the ring ports P1 and P2. This is because the received frame reaches the destination relay ECU via the normal one of the two communication paths, that is, the one not including the abnormal ring communication line. In contrast, it is possible to suppress traffic by configuring the received frame to be transmitted only via one of the ring ports P1 and P2 that is connected to the detour path. Further, by configuring the received frame to be transmitted via both the ring ports P1 and P2, another determination can become possible when it is determined that the first network is abnormal. That is, when frames are received via both the ring ports P1 and P2 of the destination relay ECU, it is possible to determine that the first network has recovered from the abnormal state.

If the switch 51 determines that the received frame indicates a high importance level in S310, the switch 51 proceeds to S330 and transfers the received frame through the detour path of the first network as in S320. Transfer is also performed in a second network different from the first network.

As in S320, the received frame may be transmitted via both the ring ports P1 and P2 in S330. The second network is a communication bus 79 in this embodiment. In S330, the switch 51 outputs a received frame as a relay target frame to the microcomputer 61, thereby causing the microcomputer 61 to transmit the received frame to the destination relay ECU via the communication bus 79. Specifically, the microcomputer 61 stores the received frame input from the switch 51 as a redundant frame in the data area in the CAN communication frame (that is, the CAN frame). Then, the CAN frame storing the redundant frame (hereinafter, redundant transfer CAN frame) is transmitted to the communication bus 79. Further, in the transmitted CAN frame for redundant transfer, information (for example, CANID) capable of specifying the destination may be information indicating the destination relay ECU as the destination.

<<Second Abnormal-Time Process>>

Figure 6:
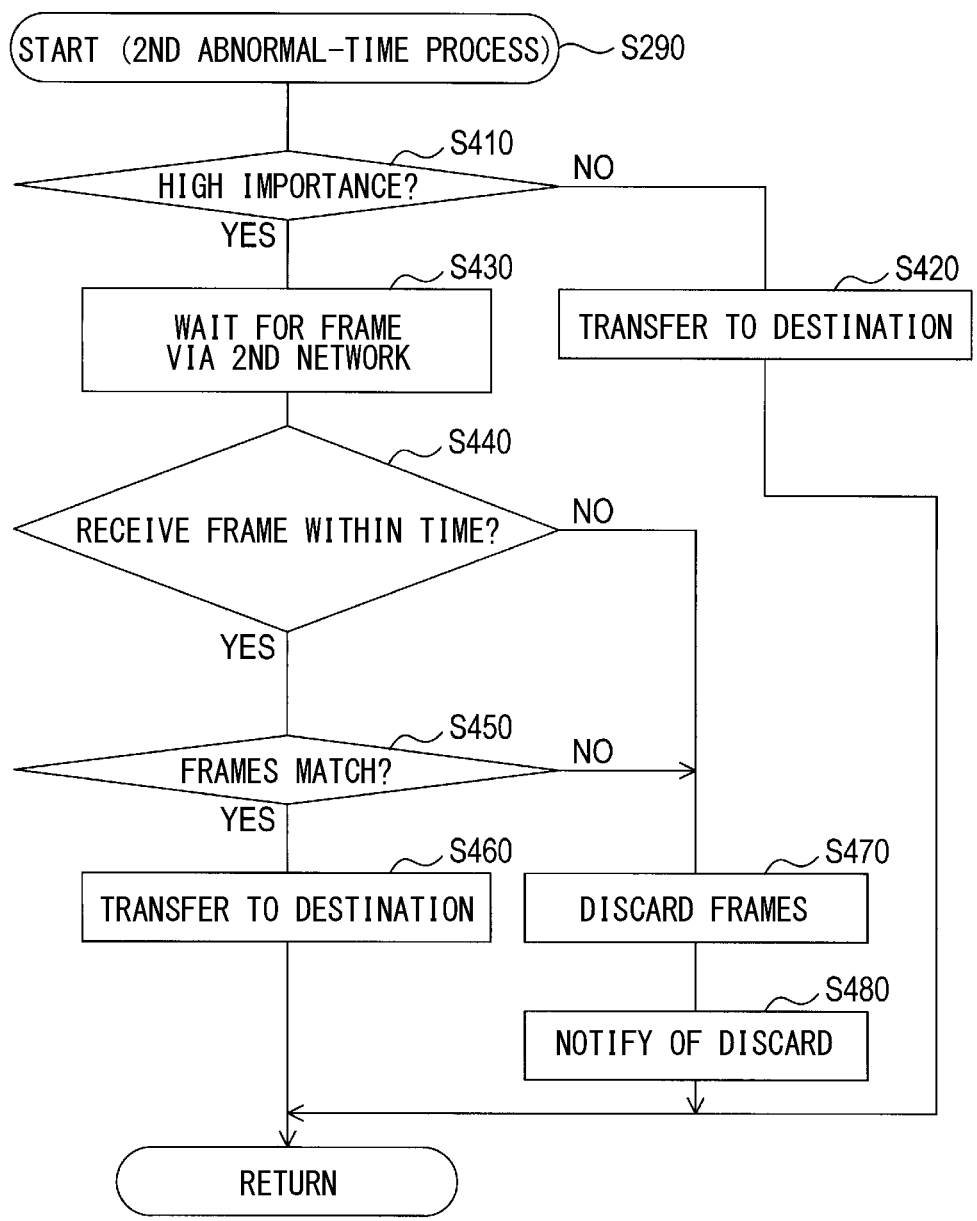
FIG. 6 is a flowchart showing a second abnormal-time process.

In S210 of FIG. 4, when the switch 51 determines that an abnormality in the first network has been detected, the switch 51 proceeds to S290, where the second abnormal-time process is started. Then, with reference to FIG. 6 illustrating the second abnormal-time process, in S410, it is determined whether or not the received frame (i.e., the frame destined for the inner connection terminal) indicates a high importance level. This S410 is the same process as S220 of FIG. 4. As described above, just for explanation, the frame, which is received via one of the ring ports P1 and P2 and destined for the inner connection terminal, may be also referred to as a subject frame.

If the switch 51 determines that the received frame does not indicate a high importance level in S410, the switch 51 proceeds to S420, and transfers the received frame to the destination as in S230 of FIG. 4. That is, in S420, the received frame is transmitted via the common port to which the destination ECU of the received frame is connected among the ports P1 to P4.

If the switch 51 determines that the received frame indicates a high importance level in S410, the switch 51 proceeds to S430. Then, in S430, the switch 51 waits until the redundant transfer CAN frame transmitted from the different relay ECU via the communication bus 79 by the process of S330 in FIG. 5 is received by the microcomputer 61 of the host relay ECU. The different relay ECU referred to here is a relay ECU in which the ECU that is the transmission source of the frame determined to indicate a high importance level in S410 is connected to the common ports P3 and P4.

Then, in S440, the switch 51 determines whether a redundant transfer CAN frame has been received via the communication bus 79 within a fixed time since the frame determined to indicate a high importance level in S410 is received via one of the ring ports P1 and P2. Note that the processes of S430 and S440 are actually performed in parallel.

If the determination in S440 is affirmative, the switch 51 proceeds to S450, and extracts the above-described redundant frame from the redundant transfer CAN frame received from the communication bus 79 by the microcomputer 61. Then, it is determined whether or not the frame received via one of the ring ports P1 and P2 matches the redundant frame extracted from the redundant transfer CAN frame.

The redundant frame extracted from the redundant transfer CAN frame is a relay target frame transmitted via the communication bus 79 by another relay ECU. Further, the process of S450 corresponds to a match determination. The relay ECU that transmits the redundant frame may divide the redundant frame into a plurality of parts, store the divided parts in a plurality of CAN frames, and transmit them via the communication bus 79. In this case, the relay ECU on the receiving side of the redundant frame may restore the redundant frame by connecting the respective divided parts of the redundant frame and stored in a plurality of CAN frames.

If the switch 51 makes an affirmative determination in S450, that is, if the received frame via one of the ring ports P1 and P2 matches the redundant frame via the communication bus 79, the switch 51 proceeds to S460. As in S230 of FIG. 4, in S460, the received frame is transferred to the destination. Note that the received frame to be transferred in S460 may be either a received frame via one of the ring ports P1 and P2 or a redundant frame via the communication bus 79. This is because both the frames are determined to be identical to each other by the determination in S450.

If the determination in S450 is negative, the switch 51 proceeds to S470 and discards the received frame via one of the ring ports P1 and P2 and the redundant frame via the communication bus 79 without transferring them to the destination. This is because an error may occur in one of the frames.

Then, in next S480, the switch 51 notifies the microcomputer in the host relay ECU, for example, of the discard of the frame (i.e., of the fact that the frames have been discarded), as in S280 of FIG. 4. The microcomputer that has received the notification notifies the different relay ECU through the communication bus 79 of the discard of the frame. Also in this case, as in S280 in FIG. 4, the different relay ECU that has received the notification may notify the ECU as the transmission source of the discarded frame of the discard of the frame. Also, in S480, the switch 51 may perform a process of notifying the transmission source ECU of the frame via the ring-shaped network that the frame has been discarded.

On the other hand, even if the switch 51 makes a negative determination in S440, the switch 51 proceeds to S470 and discards the received frame. This is because the CAN frame (i.e., the redundant frame) for redundant transfer cannot be received via the communication bus 79 even if a fixed time has elapsed, and the determination in S450 cannot be performed. Also in this case, in S480, the switch 51 performs a process for notifying of the discard of the frame.

4. Operation Example

In the communication system 1, for example, as in the above-described example, it is assumed that the ECU 15 transmits a frame f15-19 destined for the ECU 19. The frame f15-19 is assumed to be a frame determined to indicate a high importance level by the switch 51 (that is, a high importance frame).

First, the following will describe a case where the ring-shaped network is normal, that is, a case where there is no abnormality in the ring communication lines 31 to 34. The switch 51_11 that has received the frame f15-19 from the ECU 15 via the common port P3 transmits the frame f15-19 via each of the ring ports P1 and P2 in S130 of FIG. 3. Then, the transmitted frame f15-19 is input to each of the ring ports P1 and P2 of the switch 51_13 through two communication paths in the ring-shaped network.

Therefore, the switch 51_13 receives the frame f15-19 via each of the ring ports P1 and P2. If it is determined in S250 of FIG. 4 that the two frames f15-19 received via each of the ring ports P1 and P2 match each other, the received frame f15-19 is transmitted via the common port P3 to which the destination ECU 19 is connected in S260 of FIG. 4.

If the switch 51_13 determines in S250 of FIG. 4 that the frames f15-19 received respectively via the ring ports P1 and P2 do not match, the reliability of the received frame f15-19 is determined to be low. Then, the received two frames f15-19 are discarded in S270 of FIG. 4.

The switch 51_13 receives the frame f15-19 via one of the ring ports P1 and P2. If failing to receive the frame f15-19 via different one of the ring ports P1 and P2 within a fixed time since the frame f15-19 was received via the one of the ring ports P1 and P2, the switch 51_13 discards the received frame f15-19 in S270 of FIG. 4.

Next, the following will describe, as an example of when an abnormality occurs somewhere in the ring-shaped network, a case where an abnormality occurs in the ring communication line 32. The switch 51_11 that has received the frame f15-19 from the ECU 15 via the common port P3 determines "YES" in S110 of FIG. 3, and performs the process of FIG. 5 (that is, the first abnormal-time process).

Then, in S330 of FIG. 5, the switch 51_11 selects one (that is, P2) of the ring ports P1 and P2 that can transmit the frame up to the relay ECU 13 without passing through the abnormal ring communication line 32. The frame f15-19 is then transmitted via the ring port P2. Further, the switch 51_11 transmits the frame f15-19 to the relay ECU 13 via the communication bus 79 in S330 of FIG. 5.

Then, in the relay ECU 13, the switch 51_13 receives the frame f15-19 via one (that is, P2) of the ring ports P1 and P2, determines "YES" in S210 of FIG. 4, and performs the process of FIG. 6 (That is, the second abnormal-time process).

Then, the switch 51_13 receives the frame f15-19 as a redundant frame via the communication bus 79 through the microcomputer 61 of the relay ECU 13 in S430 of FIG. 6. Further, in S450 in FIG. 6, the switch 51_13 determines whether or not the two frames f15-19 received respectively via the ring port P2 and the communication bus 79 match each other. If the two frames match, the frame f15-19 is transmitted via the common port P3 in S460 of FIG. 6.

If the switch 51_13 determines in S450 of FIG. 6 that the two frames f15-19 do not match, the switch 51_13 determines that the reliability of the received frame f15-19 is low. Then, the received two frames f15-19 are discarded in S470 of FIG. 6.

The switch 51_13 receives the frame f15-19 via the ring port P2. When the frame f15-19 cannot be received from the communication bus 79 within a fixed time since the frame f15-19 was received via the ring port P2, the received frame f15-19 is also discarded in S470 of FIG. 6.

5. Effects

According to the relay ECUs 11 to 14 of the above-described embodiment, when the ring-shaped network is normal, frames each indicating a high importance level are transmitted and received respectively via the two ring ports P1 and P2, and are enabled to be transmitted through two communication paths. When the frames transmitted through the two communication paths match, the frames are transmitted to the destination ECU. Therefore, communication reliability can be improved. In the above operation example, the reliability of communication from the ECU 15 to the ECU 19 can be improved.

Further, even if an abnormality occurs in any of the ring communication lines 31 to 34 forming the ring-shaped network, a frame indicating a high importance level is enabled to be transmitted via two routes or two communication paths corresponding to two of (i) the normal one of the two communication paths in the ring-shaped network (i.e., a detour path) and (ii) the communication bus 79. When the frames transmitted through the two routes match, the frame is transmitted to the destination ECU. Therefore, even when an abnormality occurs in any of the ring communication lines 31 to 34, the communication reliability can be improved.

Further, regardless of the presence or absence of an abnormality in any one of the ring communication lines 31 to 34, a frame not indicating a high importance level is transmitted through one route (i.e., one communication path in the ring-shaped network). For this reason, compared with the configuration which uses two routes for transmission of all the frames, the traffic of a ring-shaped network or the communication bus 79 can be reduced.

In addition, if the relay ECUs 11 to 14 determine "NO" in S240 of FIG. 4, the frame already received via one of the ring ports P1 and P2 is discarded. Similarly, when it is determined "NO" in S440 of FIG. 6, a frame already received via one of the ring ports P1 and P2 is discarded. For this reason, it is possible to prevent waiting for a frame when one of the two frames does not reach due to some abnormality. Further, it is possible to prevent the transmission to the destination relay ECU of the high importance frame for which reliability confirmation has not been performed through the match determination. Further, another configuration may be provided. For instance, if "NO" is determined in S240 of FIG. 4 or if "NO" is determined in S440 of FIG. 6, the received frame may not be transmitted to the destination ECU, but be stored for a predetermined period.

In the present embodiment, the switch 51 (i.e., the first controller) and the microcomputer 61 (i.e., the second controller) function as each of a redundant transmission module or section and an abnormal-time transfer module or section. S310 to S330 in FIG. 5 correspond to the processing as a redundant transmission module or section. S410 to S470 in FIG. 6 correspond to the processing as an abnormal-time transfer module or section.

6. Other Embodiments

While the embodiment of the present disclosure has been described, the present disclosure is not limited to the embodiment described above and can be modified in various manners.

Another different configuration may be provided as follows. For example, the relay ECUs 11 to 14 may transmit frames that do not indicate a high importance level through the two communication paths, as well as the frames indicating a high importance level, and determine whether the two frames match. In this case, S120 and S140 in FIGS. 3, S220 and S230 in FIGS. 4, S310 and S320 in FIG. 5, and S410 and S420 in FIG. 6 may be deleted. Further, the abnormality detection module (i.e., the communication control circuit 73) may be configured to detect the abnormal ring communication lines 31 to 34 by a process different from the processes <1> to <5> described above.

Further, yet another different configuration may be provided as follows. For example, the relay ECUs 11 to 14 may measure the continuous number of times or the continuous time determined as "NO" in S440 of FIG. 6. If this measured value is equal to or greater than a predetermined value, the switch 51 proceeds to S460 instead of S470, where a received frame may be transferred via one of the ring ports P1 and P2 to the destination ECU. According to such a configuration, even when an abnormality occurs in the communication bus 79 and a redundant frame cannot be received via the communication bus 79, the frame transfer to the destination ECU can be performed.

Further, another different configuration may be provided as follows. For example, the relay ECUs 11 to 14 may embed abnormality information on the frame, which is transferred to the destination ECU without undergoing the match determination. The abnormality information indicates that the match determination is not executed on the frame transferred to the destination ECU. In other words, the abnormality information indicates that the reliability check is not performed. According to such a configuration, the ECU that has received the frames transferred from the relay ECUs 11 to 14 can recognize that the reliability of the received frames is low based on the abnormality information. For example, the data in the received frame can thereby be handled differently from the normal time. For example, it is possible to selectively use data in a frame in which abnormality information is included only for processing with a low reliability rank. Furthermore, another different configuration may be provided as follows. The relay ECUs 11 to 14 may embed match determination information on the frame transferred to the destination ECU when a match determination is executed between (i) the received frame through a detour path of the first network and (ii) the redundant transfer CAN frame (i.e., redundant frame) received through the communication bus 79. The match determination information indicating that the match determination is executed between the frame received through the detour path of the first network and the redundant transfer CAN frame received through the communication bus 79 as the second network.

In addition, the relay ECUs 11 to 14 and the method thereof described in the present disclosure may be each implemented by at least one special purpose computer created by configuring a memory and a processor programmed to execute one or more particular functions embodied in computer programs. Alternatively, the relay ECUs 11 to 14 and the method thereof described in the present disclosure may be each implemented by at least one special purpose computer created by configuring a processor provided by one or more special purpose hardware logic circuits. Further alternatively, the relay ECUs 11 to 14 and the method thereof described in the present disclosure may be each implemented by at least one special purpose computer created by configuring a combination of (i) a memory and a processor programmed to execute one or more particular functions and (ii) a processor provided by one or more hardware logic circuits. That is, the relay ECUs 11 to 14 and the method thereof described in the present disclosure may be each implemented by at least one special purpose computer created by configuring (i) a memory and a processor programmed to execute one or more particular functions embodied in computer programs, or (ii) a processor provided by one or more special purpose hardware logic circuits, or (iii) a combination of (a) a memory and a processor programmed to execute one or more particular functions and (b) a processor provided by one or more hardware logic circuits. The computer program may be stored in a computer-readable non-transitory tangible storage medium as instructions executed by the computer. A method of realizing the functions of the modules or sections included in the relay ECU 11 to 14 are not necessarily required to include software, all functions may be implemented using one or more hardware circuits.

Multiple functions of one element in the described above embodiment may be implemented by multiple elements, or one function of one element may be implemented by multiple elements. Further, multiple functions of multiple elements may be implemented by one element, or one function implemented by multiple elements may be implemented by one element. Alternatively, a part of the configuration of the above embodiment may be omitted. At least a part of the configuration of the above embodiment may be added to or replaced with another configuration of another embodiment.

The present disclosure may be realized in various forms in addition to the relay ECUs 11 to 14 described above, such as a system including the relay ECUs 11 to 14 as components, a program for causing a computer to function as the relay ECUs 11 to 14, a non-transitory tangible storage medium such as semiconductor memory in which the program is stored, or a network abnormality detection method.

For reference to further explain features of the present disclosure, the description is added as follows.

In a related art, among a plurality of relay devices connected in a ring shape, a relay device receives a frame via the common port in the relay device; the frame is destined for a terminal (destination terminal) connected to a common port in different one (i.e., different relay device) of the plurality of relay devices. The frame is transmitted via each of the two ring ports in the relay device. Then, the different relay device to which the destination terminal of the frame is connected receives two frames that reach each of the two ring ports in the different relay device via two communication paths. If the two frames match each other, the frame is transferred to the destination terminal. Such a configuration can improve a communication reliability.

Further, a technique is known for detecting, in each relay device, a communication line abnormality state in which an abnormality has occurred among a plurality of communication lines connecting a plurality of relay devices in a ring shape.

As a result of detailed studies, the inventor has found the following issues. In the above related art, when an abnormality occurs in any of a plurality of communication lines that connect a plurality of relay devices in a ring shape, the frame eventually arrives at the relay device, which the frame destination terminal is connected to, via only one of the two communication paths. Therefore, it is not possible to improve reliability by determining whether two frames match each other.

It is thus desired to provide a relay device that improves the reliability of communication even when an abnormality occurs in any of a plurality of communication lines connecting a plurality of relay devices in a ring shape.

An aspect of the present disclosure described herein is set forth in the following clauses.

According to an aspect of the present disclosure, a relay device is provided as follows. The relay device is one of a plurality of relay devices in a communication system. Each relay device includes a plurality of ports that include a common port and two ring ports. The common port is connected with a terminal. Each of the two ring ports is connected with one of a plurality of communication lines to connect the plurality of relay devices to each other via the plurality of the communication lines to form a ring-shaped network. The plurality of relay devices are further connected to each other via a communication bus other than the plurality of communication lines.

The relay device includes an abnormality detection module which may be implemented by a first controller, a redundant transmission module which may be implemented by the first controller and a second controller, and an abnormal-time transfer module which may be implemented by the first controller and the second controller.

The abnormality detection module is configured to detect a communication line abnormality state that is a state where an abnormal communication line is detected among the plurality of communication lines included in the ring-shaped network.

The redundant transmission module is configured to transmit a first relay target frame in response to that the first relay target frame is received via the common port included in the relay device under the communication line abnormality state. Here, the first relay target frame is destined for a different terminal connected to a different relay device that is different one of the plurality of relay devices via a different common port included in the different relay device. The first relay target frame is transmitted via both of the communication bus and the ring-shaped network. The ring-shaped network uses either (i) both of the two ring ports included in the relay device or (ii) one of the two ring ports included in the relay device via which the first relay target frame is enabled to be transmitted up to the different relay device without passing through the abnormal communication line under the communication line abnormality state.

The abnormal-time transfer module is configured to (i) receive a second relay target frame via the communication bus on condition that, under the communication line abnormality state, a subject frame that is a frame whose destination is the terminal connected via the common port included in the relay device is received via one of the two ring ports included in the relay device, (ii) execute, upon receiving the second relay target frame, a match determination whether to be affirmative or not affirmative, the match determination being affirmative in response to that the subject frame received via the one of the two ring ports matches the second relay target frame received via the communication bus, (iii) transmit the subject frame received via the one of the two ring ports to the terminal connected via the common port in response to the match determination being affirmative, and (iv) discard the subject frame received via the one of the two ring ports and the second relay target frame received via the communication bus without transmitting the subject frame and the second relay target frame via the common port in response to the match determination being not affirmative. Note that the first controller and the second controller may be provided as one or more controllers.

The relay device according to the above aspect may be provided as including (i) a plurality of ports that include a common port connected with a terminal and two ring ports each connected with one of a plurality of communication lines forming a first network being a ring-shaped network; (ii) a bus interface connected with a communication bus different from the plurality of communication lines, the communication bus connecting the plurality of relay devices to each other to form a second network; and (iii) one or more controllers. The one or more controllers may function as the above-described abnormality detection module, the redundant transmission module, and the abnormal-time transfer module.

Further, an individual module in each controller or an individual controller may be configured by (i) a central processing unit (CPU) along with memory storing instructions executed by the CPU or (ii) hardware circuitry with no CPU, or (iii) a combination of the CPU along with memory and the hardware circuitry.

Thus, a relay device according to the above aspect of the present disclosure is used as each of the relay devices in the communication system. The relay device includes an abnormality detection module which detects an abnormal communication line among the several communication lines included in the ring-shaped network. Further, the relay device includes a redundant transmission module as a part that functions when the relay device is on the transmission side. In addition, the relay device includes an abnormal-time transfer module as a part that functions when the relay device is on the reception side.

To put another way, the redundant transmission module and the abnormal-time transfer module will be described on the assumption that (i) an abnormal communication line is detected by the abnormality detection module in a first relay device and a second relay device, and (ii) the frame fA-B destined for the terminal B connected to the common port in the second relay device is transmitted from the terminal A connected to the common port in the first relay device. Note that, as described above, each of the first relay device and the second relay device corresponds to the relay device according to the aspect of the present disclosure.

In the first relay device, under the state where an abnormal communication line is detected by the abnormality detection module, when the terminal A transmits the frame fA-B, the redundant transmission module operates. This is because the first relay device receives the frame fA-B from the common port as a relay target frame that is a frame whose destination is a terminal connected to the common port of another relay device (i.e., different relay device).

The redundant transmission module in the first relay device is configured to transmit the frame fA-B as a relay target frame via either (i) one of the two ring ports in the first relay device that allows a frame to reach a destination relay device without passing through an abnormal communication line, or (ii) both the two ring ports in the first relay device.

The destination relay device is another relay device (i.e., different relay device) to which the destination terminal of the relay target frame is connected. In this aspect, the destination relay device is the second relay device. Further, the redundant transmission module transmits the frame fA-B to the destination relay device via the communication bus.

Then, the frame fA-B passes through the communication path that does not pass through the abnormal communication line in the ring-shaped network between the first relay device and the second relay device. The frame fA-B reaches one of the ring ports in the second relay device, and also reaches the second relay device via the communication bus.

The abnormal-time transfer module thereby operates in the second relay device. This is because the second relay device detects an abnormal communication line by the abnormality detection module, and receives a frame (i.e., frame fA-B) which is destined for a terminal connected to the common port of the second relay device, via one of the ring ports in the second relay device.

In the second relay device, the abnormal-time transfer module receives the frame fA-B transmitted to the communication bus by the redundant transmission module in the first relay device, and performs a determination process (i.e., execute a match determination) to determine whether or not the frame fA-B received via one of the ring ports matches the frame fA-B received via the communication bus.

In response to making an affirmative determination by the determination process (i.e., in response to the match determination being affirmative), the abnormal-time transfer module transmits the frame fA-B, which is received via one of the ring ports, to the destination terminal (i.e., the terminal B) of the frame via the common port. In addition, in response to making a negative determination by the determination process (i.e., in response to the match determination being not affirmative), the abnormal-time transfer module discards the frame received via the ring port and the frame received via the communication bus without transmitting the frames via the common port.

According to the relay device of the aspect of the present disclosure, even when an abnormality occurs in any of the plurality of communication lines that connect the plurality of relay devices in a ring shape, a relay target frame can be transmitted via two communication paths or two routes. When the two relay target frames transmitted through the two communication paths or two routes match each other, the relay target frame is transmitted to the destination terminal. Therefore, even when an abnormality occurs in one of the plurality of communication lines connecting the plurality of relay devices in a ring shape, the reliability of communication can be improved.

Further, the redundant transmission module may determine whether the relay target frame received via the common port indicates a high importance level. In response to that it is determined that it does not indicate a high importance level, the transmission of the relay target frame to the communication bus may be disabled (that is, not performed). In addition, the abnormal-time transfer module may determine whether or not the frame received via one of the ring ports indicates a high importance level according to the same rule as that of the redundant transmission module. In response to that it is determined that the frame does not indicate a high importance level, the abnormal-time transfer module may abandon both (i) the reception of the relay target frame via the communication bus and (ii) the performance of the determination process (i.e., match determination), and transmit a frame, which is received via one of the ring ports, to a destination terminal of the frame via the common port. In other words, when an abnormality occurs in one of a plurality of communication lines, the transmission of the relay target frame using the communication bus may be performed only for a frame indicating a high importance level. Such a configuration can easily reduce the traffic of the communication bus.

What is claimed is:

1. A relay device that is one of a plurality of relay devices in a communication system, the relay device comprising:
   a plurality of ports that include a common port and two ring ports,
     the common port being connected with a terminal,
     each of the two ring ports being connected with one of a plurality of communication lines to connect the plurality of relay devices to each other via the plurality of the communication lines to form a ring-shaped network as a first network;
   a bus interface connected with a communication bus as a second network to connect the plurality of relay devices to each other;
   an abnormality detection module configured to detect a communication line abnormality state that is a state where an abnormal communication line is detected among the plurality of communication lines included in the ring-shaped network;
   a redundant transmission module configured to transmit a first relay target frame in response to that the first relay target frame is received via the common port included in the relay device under the communication line abnormality state,
     the first relay target frame whose destination is a different terminal connected to a different relay device that is different one of the plurality of relay devices via a different common port included in the different relay device,
     the first relay target frame being transmitted via both of the ring-shaped network and the communication bus,
     the ring-shaped network using either (i) both of the two ring ports included in the relay device or (ii) one of the two ring ports included in the relay device via which the first relay target frame is enabled to be transmitted up to the different relay device without passing through the abnormal communication line under the communication line abnormality state; and
   an abnormal-time transfer module configured to
     receive via the communication bus a second relay target frame whose destination is the terminal connected via the common port included in the relay device on condition that, under the communication line abnormality state, a subject frame that is a frame whose destination is the terminal connected via the common port included in the relay device has been received via one of the two ring ports included in the relay device,
     execute, upon receiving the second relay target frame, a match determination whether to be affirmative or not affirmative, the match determination being affirmative in response to that the subject frame received via the one of the two ring ports matches the second relay target frame received via the communication bus,
     transmit the subject frame received via the one of the two ring ports to the terminal connected via the common port in response to the match determination being affirmative, and
     discard the subject frame received via the one of the two ring ports and the second relay target frame received via the communication bus without transmitting the subject frame and the second relay target frame via the common port in response to the match determination being not affirmative.

2. The relay device according to claim 1, wherein
in response to that the second relay target frame is not received via the communication bus within a fixed time since the subject frame whose destination is the terminal connected via the common port included in the relay device was received via the one of the two ring ports, the abnormal-time transfer module is configured not to transmit the subject frame received via the one of the two ring ports to the terminal connected via the common port.

3. The relay device according to claim 1, wherein:
the redundant transmission module is configured to make a first determination as to whether the first relay target frame received via the common port indicates a high importance level under a first rule;
in response to making the first determination that the first relay target frame does not indicate a high importance level, the redundant transmission module is configured not to transmit the first relay target frame via the communication bus;
the abnormal-time transfer module is configured to make a second determination as to whether the subject frame received via the one of the two ring ports indicates a high importance level under a second rule that is identical to the first route under which the first determination is made by the redundant transmission module; and
in response to making the second determination that the subject frame received via the one of the two ring ports does not indicate a high importance level, the abnormal-time transmission module is configured to transmit the subject frame received via the one of the two ring ports to the terminal connected via the common port while neither (i) receiving the second relay target frame via the communication bus, nor (ii) executing the match determination whether to be affirmative or not affirmative.

4. A relay device that is one of a plurality of relay devices in a communication system, the relay device comprising:
a plurality of ports that include a common port and two ring ports,
the common port being connected with a terminal,
each of the two ring ports being connected with one of a plurality of communication lines to connect the plurality of relay devices to each other via the plurality of the communication lines to form a ring-shaped network as a first network;
a bus interface connected with a communication bus as a second network to connect the plurality of relay devices to each other; and
one or more controllers configured to
detect a communication line abnormality state that is a state where an abnormal communication line is detected among the plurality of communication lines included in the ring-shaped network,
the one or more controllers being further configured to
transmit a first relay target frame, whose destination is a different terminal connected to a different relay device that is different one of the plurality of relay devices via a different common port included in the different relay device, via both of (i) the communication bus and (ii) one of the two ring ports bypassing the abnormal communication line, in response to receiving the first relay target frame via the common port under the communication line abnormality state,
the one or more controllers being further configured to,
determine whether a subject frame and a second relay target frame match each other in response to receiving both of the subject frame via one of the ring ports and the second relay target frame via the communication bus under the communication line abnormality state, each of the subject frame and the second relay target frame being destined for the terminal connected via the common port included in the relay device,
transmit the subject frame to the terminal connected via the common port in response to the subject frame and the second relay target frame matching each other, and
discard the subject frame and the second relay target frame without transmitting to the terminal connected via the common port in response to the subject frame and the second relay target frame not matching each other.

5. The relay device according to claim 4, wherein:
the one or more controllers are further configured to make a first determination as to whether the first relay target frame received via the common port indicates a high importance level under a first rule;
in response to making the first determination that the first relay target frame does not indicate a high importance level, the one or more controllers being further configured not to transmit the first relay target frame via the communication bus;
the one or more controllers being further configured to make a second determination as to whether the subject frame received via the one of the two ring ports indicates a high importance level under a second rule that is identical to the first route under which the first determination is made; and
in response to making the second determination that the subject frame received via the one of the two ring ports does not indicate a high importance level, the one or more controllers being further configured to transmit the subject frame received via the one of the two ring ports to the terminal connected via the common port while neither (i) receiving the second relay target frame via the communication bus, nor (ii) determining whether the subject frame and the second target frame match each other.

6. A relay device that is one of a plurality of relay devices in a communication system, the relay device comprising:
a plurality of ports that include a common port and two ring ports,
the common port being connected with a terminal,
each of the two ring ports being connected with one of a plurality of communication lines to connect the plurality of relay devices to each other via the plurality of the communication lines to form a ring-shaped network as a first network;
a bus interface connected with a communication bus as a second network to connect the plurality of relay devices to each other;
an abnormality detection module configured to detect a communication line abnormality state that is a state where an abnormal communication line is detected among the plurality of communication lines included in the ring-shaped network;
a redundant transmission module configured to transmit a first relay target frame in response to that the first relay target frame is received via the common port included in the relay device under the communication line abnormality state, the first relay target frame whose destination is a different terminal connected to a different relay device that is different one of the plurality of relay devices via a different common port included in the different relay device, the first relay target frame being transmitted via both of the ring-shaped network and the communication bus, the ring-shaped network using either (i) both of the two ring ports included in the relay device or (ii) one of the two ring ports included in the relay device via which the first relay target frame is enabled to be transmitted up to the different relay device without passing through the abnormal communication line under the communication line abnormality state; and an abnormal-time transfer module configured to receive via the communication bus a second relay target frame whose destination is the terminal connected via the common port included in the relay device on condition that, under the communication line abnormality state, a subject frame that is a frame whose destination is the terminal connected via the common port included in the relay device has been received via one of the two ring ports included in the relay device, execute, upon receiving the second relay target frame, a match determination whether to be affirmative or not affirmative, the match determination being affirmative in response to that the subject frame received via the one of the two ring ports matches the second relay target frame received via the communication bus, transmit the subject frame received via the one of the two ring ports to the terminal connected via the common port in response to the match determination being affirmative, and discard the subject frame received via the one of the two ring ports and the second relay target frame received via the communication bus without transmitting the subject frame and the second relay target frame via the common port in response to the match determination being not affirmative, wherein:

the redundant transmission module is configured to make a first determination as to whether the first relay target frame received via the common port indicates a high importance level under a first rule;

in response to making the first determination that the first relay target frame does not indicate a high importance level, the redundant transmission module is configured not to transmit the first relay target frame via the communication bus;

the abnormal-time transfer module is configured to make a second determination as to whether the subject frame received via the one of the two ring ports indicates a high importance level under a second rule that is identical to the first route under which the first determination is made by the redundant transmission module; and in response to making the second determination that the subject frame received via the one of the two ring ports does not indicate a high importance level, the abnormal-time transmission module is configured to transmit the subject frame received via the one of the two ring ports to the terminal connected via the common port while neither (i) receiving the second relay target frame via the communication bus, nor (ii) executing the match determination whether to be affirmative or not affirmative.

* * * * *